United States Patent [19]

Mahler et al.

[11] Patent Number: 5,378,485
[45] Date of Patent: Jan. 3, 1995

[54] METHOD OF CONTROLLING FOAM WITH CARBONIC ACID ESTER AGENTS

[75] Inventors: Ulrike Mahler, Suhr, Switzerland; Alfred Westfechtel, Hilden, Germany; Hans-Juergen Sladek, Krefeld, Germany; Sylke Kielmann, Erkrath, Germany

[73] Assignee: Henkel Kommanditgesellschaft Auf Aktien, Duesseldorf, Germany

[21] Appl. No.: 78,330

[22] PCT Filed: Dec. 6, 1991

[86] PCT No.: PCT/EP91/02341

§ 371 Date: Aug. 17, 1993

§ 102(e) Date: Aug. 17, 1993

[87] PCT Pub. No.: WO92/11073

PCT Pub. Date: Jul. 9, 1992

[30] Foreign Application Priority Data

Dec. 24, 1990 [DE] Germany ............... 4041754

[51] Int. Cl.$^6$ .................. A23L 1/212; A23L 3/3517
[52] U.S. Cl. ................... 426/329; 426/62; 426/470; 426/615; 252/174.21; 252/358; 435/266; 435/812
[58] Field of Search ............... 426/329, 470, 62, 615; 252/174.21, 358; 435/266, 812

[56] References Cited

U.S. PATENT DOCUMENTS 3,332,980 7/1967 Leary et al.

FOREIGN PATENT DOCUMENTS 1447238 6/1966 France.
1242569 12/1967 Germany.

OTHER PUBLICATIONS

Ullmanns Enzyklopadie der Technischen Chemie, vol. A 11 (5th Ed.) 1988, pp. 465–490.

Houben Weyl, "Methoden der organischen Chemie", 4th Ed., vol. E4, p. 66 et seq.
J. Chem. Soc. 117, 708 (1920).
J. Prakt. Chem. 22, 353 (1880).

*Primary Examiner*—Helen Pratt
*Attorney, Agent, or Firm*—Ernest G. Szoke; Wayne C. Jaeschke; John Daniel Wood

[57] ABSTRACT

Methods of use of carbonic acid esters corresponding to general formula I:

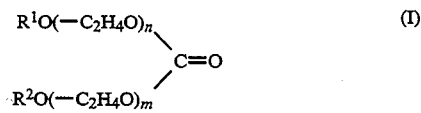

in which $R^1$ is an alkyl radical derived from an aliphatic saturated primary alcohol containing 1 to 22 carbon atoms and $R^2$ is an alkyl radical derived from an aliphatic, saturated primary alcohol containing 1 to 8 carbon atoms and/or has the same meaning as $R^1$ and n is a number of 2 to 20 while m is 0 or has the same meaning as n, as foam control agents for the sugar beet or potato-processing food industry and/or in fermentation processes are provided. In the industrial processing of sugar-containing plant juices, as carried out on an industrial scale in the case of sugar beet, particular difficulties are caused by excessive foaming in the defecation units, during transport of the beet, in the diffusors and in the carbonizing tanks and before the evaporators, thus, use of the esters in these processes is advantageous. Other areas of use include the production of potato products, such as chips or French fries, in the production of baker's yeast using molasses or other industrial fermentation processes, such as the production of medicaments, to reduce foaming to a level which does not interfere with the industrial production process.

10 Claims, No Drawings

METHOD OF CONTROLLING FOAM WITH CARBONIC ACID ESTER AGENTS

BACKGROUND OF THE INVENTION

1. Field of the Invention

This invention relates to the use of special carbonic acid esters as foam control agents in the processing and/or production of foods and in fermentation processes.

2. Discussion of Related Art

Foam problems can be prevented before the formation of foam by addition of foam inhibitors and after the formation of foam by addition of defoamers. In this sense, both foam inhibitors and defoamers are foam control agents.

In the industrial processing and/or production of foods, considerable significance is attributed to the control and prevention of foaming. For example, in the industrial processing of sugar-containing plant juices, as carried out on an industrial scale in the case of sugar beet, particular difficulties are caused by excessive foaming in the diffusors, in the defecation units, in the carbonizing tanks and in the evaporators. It is also important in the production of potato products, such as chips or pommes frites (French fries), in the production of baker's yeast using molasses or other industrial fermentation processes, such as the production of medicaments, to reduce foaming to a level which does not interfere with the industrial production process.

The auxiliaries used to regulate foaming in the sugar industry could enter the end product, sugar, in traces, so that physiologically completely safe foam control agents are of course essential. In addition, foam control agents which enter the wastewater during the external beet washing process should be readily biodegradable. Moreover, the potential residues of foam control agents, which enter the molasses during processing of sugar beet, should not adversely affect yeast production because the molasses thus obtained is used as a nutrient in the industrial production of baker's yeast. Where they are used in the potato-processing industry, foam control agents must be at least capable of regulating the starch foam which is so difficult to control. In practice, foam-suppressing agents are generally expected to develop a good spontaneous effect and to show a good long-term effect in low concentrations.

Fats and oils, such as rapeseed oil, peanut oil, olive oil and wool grease, have long been used for defoaming in the sugar and yeast industries. Fatty acid monoglycerides, fatty acid polyglycol esters, polyalkylene glycols, ethylene oxide adducts with alkyl phosphoric acids and with branched alcohols, alkylene oxide adducts with oligosaccharides and free fatty alcohols have also been proposed for this purpose. Typical foam control agents with patent literature references and potential applications are described in Ullmanns Enzyklopädie der technischen Chemie, Vol. A 11 (5th Edition) 1988, pages 465 to 490.

According to DE-AS 12 42 569, carbonic acid esters in which the alkyl groups may optionally be interrupted by an oxygen atom are used as foam-suppressing agents for foaming detergent systems containing anionic, cationic and nonionic compounds. The machine washing and disinfection of bottles and cans in the food industry is mentioned as one possible application. Although the dialkyl carbonates mentioned in the cited document have a good defoaming effect for this particular application, this does not necessarily mean that they are suitable for other applications, including for example the sugar industry, the potato industry and fermentation processes and their special requirements. Thus, in the sugar industry for example, totally different substances, such as saponins, are responsible for foaming and, accordingly, also influence the constitution of the foam generated. In addition, bottle washing processes differ considerably in their mechanics and, above all, in the introduction of air which in turn impairs the nature and extent and the foam formed.

U.S. Pat. No. 3,332,980 describes alkoxylated carbonic acid esters of which the alkyl radicals have a degree of alkoxylation of 1 to 150 and which may be used for various applications. One of the many possible applications of these substances includes defoaming in its broadest sense, although the document in question does not mention which of the alkoxylated carbonic acid esters may be used in which quantities for which type of defoaming. As explained, however, foams often differ considerably from one another, so that there was still a need for special compounds which would satisfy the above-mentioned requirements for use as a foam control agent in the sugar industry, in the potato-processing industry and/or in fermentation processes.

Accordingly, the problem addressed by the present invention was to provide new special foam control agents which would show improved spontaneous and long-term activity in low concentrations and which in addition would satisfy the requirements for their use in the sugar industry, in the potato industry and in fermentation processes.

DESCRIPTION OF THE INVENTION

Accordingly, the present invention relates to the use of carbonic acid esters corresponding to general formula I

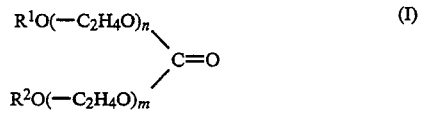

in which $R^1$ is an alkyl radical derived from an aliphatic saturated primary alcohol containing 1 to 22 carbon atoms and $R^2$ is an alkyl radical derived from an aliphatic, saturated primary alcohol containing 1 to 8 carbon atoms and/or has the same meaning as $R^x$ and n is a number of 2 to 20 while m is 0 or has the same meaning as n, as foam control agents for the sugar beet or potato-processing food industry and/or in fermentation processes.

The carbonic acid esters used in accordance with the invention are compounds known per se and may be prepared by the methods described in Houben Weyl, "Methoden der organisthen Chemie", 4th Edition, Vol. E4, pages 66 st seq. On way of obtaining these compounds is the reaction of phosgene with aliphatic alcohols which leads to symmetrical carbonic acid esters, cf. J. Chem. Sec. 117, 708 (1920). Another method is the reaction of chloroformic acid esters with alcohols, in which case symmetrical or asymmetrical carbonic acid esters may be obtained according to the type of reactants used, cf. J. Prakt. Chem. 22, 353 (1880). The most simple synthesis is the transesterification of carbonic acid alkyl esters with alcohols in the presence of basic catalysts, such as sodium methanolate or alkali metal hydroxide, with elimination of the more readily volatile alcohol component. It is possible by this particular process to obtain symmetrical and/or asymmetrical carbon acid esters according to the quantity in which the alcohols required for the transesterification are used.

According to the invention, the carbonic acid esters corresponding to general formula I are preferably obtained by transesterification of dialkyl carbonates with adducts of ethylene oxide and aliphatic, saturated primary alcohols containing 1 to 22 carbon atoms. The dialkyl carbonates suitable for transesterification have two identical aliphatic saturated alkyl radicals containing 1 to 8 carbon atoms which may be branched or unbranched. Particularly suitable dialkyl carbonates are dimethyl, diethyl, di-n-propyl, diisopropyl, di-n-butyl, diisobutyl, di-n-octyl or di-2-ethylhexyl carbonate.

To produce the carbonic acid esters corresponding to general formula I, the dialkyl carbonates mentioned are partly or at least substantially completely esterified with adducts of 2 to 20 mol ethylene oxide with aliphatic, saturated primary alcohols containing 1 to 22 carbon atoms. Adducts of 2 to 20 mol ethylene oxide with aliphatic, saturated, primary unbranched alcohols containing 1 to 22 carbon atoms are preferred. Suitable representatives of these ethoxylated alcohols are adducts of 2 to 20 mol ethylene oxide with methanol ethanol, propanol, butanol, pentanol, hexanol, octanol, nonanol, decanol, dodecanol, tetradecanol, hexadecanol, octadecanol, eicosanol and docosanol. Of these, adducts of ethylene oxide with aliphatic, saturated, primary unbranched alcohols containing 6 to 20 and, more particularly, 8 to 18 carbon atoms, so-called saturated fatty alcohols, are most particularly preferred. As usual in oleochemistry, the saturated fatty alcohols containing 8 to 18 carbon atoms may be used in the form of the technical mixtures rich in these fatty alcohols which are obtained in the sodium reduction or in the catalytic hydrogenation of fatty acid mixtures from the hydrolysis of native fats or oils. The adducts of ethylene oxide with the alcohols mentioned are produced by known methods carried out at elevated temperature and pressure in the presence of suitable ethoxylation catalysts, such as alkali metal alcoholate or hydrotalcite. 2 to 20 mol ethylene oxide are reacted per mol alcohol, depending upon the required degree of ethoxylation n or m. The following adducts of ethylene oxide with alcohols are particularly preferred for the production of the carbonic acid esters of general formula I by transesterification of the dialkyl carbonates: octanol with 4 mol ethylene oxide, octanol with 8 mol ethylene oxide, dodecanol with 2 mol ethylene oxide, dodecanol with 6 mol ethylene oxide, dodecanol with 7 mol ethylene oxide, tetradecanol with 2 mol ethylene oxide, tetradecanol with 6 mol ethylene oxide, tetradecanol with 7 mol ethylene oxide, hexadecanol with 2 mol ethylene oxide, hexadecanol with 7 mol ethylene oxide, octadecanol with 2 mol ethylene oxide, octadecanol with 7 mol ethylene oxide and/or technical mixtures thereof.

As already mentioned, the transesterification of the dialkyl carbonates with the adducts of ethylene oxide and the aliphatic, saturated, primary $C_{1-22}$ alcohols mentioned may be partial or complete. So-called symmetrical carbonic acid esters are obtained by complete or least substantially complete transesterification. One embodiment of the present invention is characterized by the use of symmetrical carbonic acid esters corresponding to general formula I in which $R^2$ has the same meaning as the alkyl radical $R^1$ and $R^1$ is derived from one of the above-described adducts of ethylene oxide with aliphatic, saturated, primary $C_{1-22}$ alcohols, so that the indices n and m representing the degree of ethoxylation stand for the same number. Symmetrical carbonic acid esters corresponding to general formula I, in which $R^1$ and $R^2$ represent the same alkyl radical derived from an aliphatic, saturated primary alcohol containing 6 to 20 carbon atoms, preferably from unbranched alcohols containing 8 to 18 carbon atoms, and n and m stand for the same number of 2 to 20, preferably 2 to 6 and more preferably 2 to 12, are most particularly preferred. Symmetrical carbonic acid esters corresponding to the following formulae

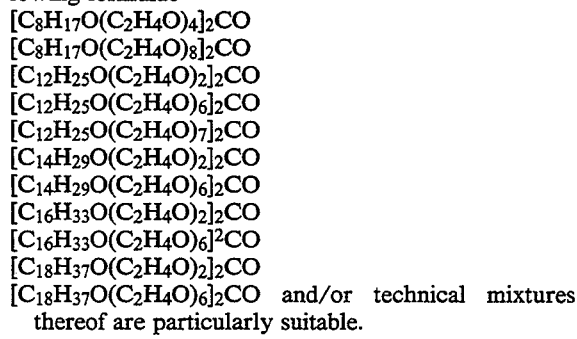

and/or technical mixtures thereof are particularly suitable.

The production of these symmetrical carbonic acid esters used in accordance with the invention by transesterification requires at least 0.5 mol of the dialkyl carbonates mentioned per mol of the above-mentioned adducts of ethylene oxide with the alcohols mentioned. The dialkyl carbonates are preferably used in quantities of 0.55 mol to 1 mol per mol adducts of ethylene oxide with the alcohols mentioned. In addition, it is of advantage to carry out the transesterification in the presence of basic catalysts, preferably sodium methanolate, and to remove the alcohol released from the dialkyl esters by distillation. However, since transesterifications are equilibrium reactions, the symmetrical carbonic acid esters may contain both unreacted adducts of ethylene oxide with the alcohols mentioned and only partly transesterified carbonic acid esters as secondary products. If desired, the unreacted ethoxylated alcohols may be removed by phosphogenation.

Another embodiment of the present invention is characterized by the use of carbonic acid esters corresponding to general formula I, in which $R^2$ is a saturated aliphatic alkyl radical containing 1 to 8 carbon atoms and may be the same as or different from the alkyl radical $R^1$ which in turn is derived from one of the aliphatic, saturated, primary $C_{1-22}$ alcohols already mentioned. At all events, the indices m and n in this embodiment differ from one another insofar as m=0 and n is a number of 2 to 20 representing the degree of ethoxylation. Of the asymmetrical carbonic acid esters of general formula I, those in which $R^2$ is a methyl or ethyl group, $R^1$ is an alkyl radical derived from an aliphatic saturated primary $C_{6-20}$ alcohol and preferably from an unbranched $C_{8-18}$ alcohol and n is a number of 2 to 16 and preferably 2 to 12 and m=0 are most particularly preferred. Asymmetrical carbonic acid esters corresponding to the following formulae $C_8H_{17}O(C_2H_4O)_4COOCH_3$
$C_8H_{17}O(C_2H_4O)_8COOCH_3$
$C_{12}H_{25}O(C_2H_4O)_2COOCH_3$
$C_{14}H_{29}O(C_2H_4O)_6COOC_2H_5$
$C_{16}H_{33}O(C_2H_4O)_7COOC_2H_5$ $C_{18}H_{37}O(C_2H_4O)_2COOCH_3$ and/or technical mixtures thereof are particularly suitable.

In order to obtain these asymmetrical carbonic acid esters, at least 1 mol and preferably 4 mol to 10 mol dimethyl carbonate is used per mol adducts of ethylene oxide with the alcohols mentioned. The transesterification may otherwise be carried out in the same way as described for the symmetrical carbonic acid esters. However, the asymmetrical carbonic acid esters obtained in this way may again contain both unreacted adducts of ethylene oxide with the described alcohols and partly symmetrical carbonic acid esters. Mixtures such as these are also intended to be covered by general formula I for asymmetrical carbonic acid esters. Mixtures of the above-described symmetrical and asymmetrical carbonic acid esters may of course also be used for the purposes of the invention.

Carbonic acid esters which are liquid at temperatures below 25° C. and preferably at temperatures below 10° C. are preferred for the purposes of the invention because liquids are more suitable for metering and for optimal mixing with the material to be defoamed and for thoroughly wetting foam bubbles which have already formed. Solutions of solid carbonic acid esters corresponding to general formula I in liquid carbonic acid esters corresponding to general formula I and/or in a solvent may of course also be used, but have the disadvantage that an additional step is involved in preparing the solutions.

Mixtures of carbonic acid esters corresponding to general formula I with commercial defoamers and/or foam inhibitors, such as fatty acid monoglycerides, fatty acid polyglycol esters and/or polyalkylene glycols, which are liquid at temperatures below 25° C. may also be used as foam control agents.

The carbonic acid esters used in accordance with the invention may be used in widely varying quantities according to requirements. They are effective even when added in very small quantities, preferably in quantities below 1% by weight and, more particularly, in quantities of 0.001 to 0.8% by weight, based on the material to be defoamed, for example sugar sirup solutions. Technologically, there is no upper limit to the quantity added. For economic reasons, however, as little foam control agent as possible will be added to the material to be defoamed.

The carbonic acid esters used in accordance with the invention act both as foam inhibitors and as defoamers and, accordingly, may be added before or after the generation of foam. They have a very good spontaneous and long-term effect over the entire pH range. In addition, they may readily be removed from the material to be defoamed, depending on the process conditions, so that they may be used as an auxiliary in the food industry by virtue of their neutral odor, their neutral taste and their physiological safeness. Particularly good results are obtained where the carbonic acid esters corresponding to general formula I are used as foam control agents in the processing of sugar beet, for example in the transport, storage and size-reduction of sugar beet and in the extraction process, or in the production of potato products and/or in fermentation processes, more particularly in the production of baker's yeast using molasses.

The biodegradability of the carbonic acid esters according to the invention is of particular importance.

EXAMPLES

A) Production of the carbonic acid esters

EXAMPLE 1

4 Mol dimethyl carbonate and 0.5 mol-% sodium methanolate in the form of a 30% methanol solution were heated under nitrogen to 80° C. and 1 mol of a commercial adduct of 2 mol ethylene oxide with I mol of a technical $C_{12-14}$ fatty alcohol mixture (chain distribution 0 to 2% $C_{10}$; 70 to 75% $C_{12}$; 24 to 30% $C_{14}$; 0 to 2% $C_{16}$) was then added dropwise. The reaction mixture was heated in steps (15° C./h) to 140° C. and kept for another 4 hours at a maximum temperature of 140° C. The methanol released and excess dimethyl carbonate were distilled off. The reaction mixture was then stirred for 1 hour at 90° C. with 1% by weight layer silicate (Tonsil ®), followed by filtration under suction. An asymmetrical carbonic acid ester having a residual OH value of 3.1 was obtained.

EXAMPLE 2

1.5 Mol dimethyl carbonate, 0.5 mol-% sodium methanolate in the form of a 30% methanol solution and 2 mol of a commercial adduct of 2 mol ethylene oxide with 1 mol of a technical $C_{12-14}$ fatty alcohol mixture (for chain distribution, see Example 1) were slowly heated under nitrogen to at most 140° C. (15° C./h) and left at that temperature for 1 hour. The methanol released and excess dimethyl carbonate were distilled off. The reaction mixture was worked up in the same way as in Example 1. A symmetrical carbonic acid esters having a residual OH value of 29.4 was obtained.

EXAMPLE 3

Dimethyl carbonate, sodium methanolate in the form of a 30% methanol solution and a commercially available adduct of 6 mol ethylene oxide with 1 mol of a technical $C_{12-14}$ fatty alcohol mixture (for chain distribution, see above) were reacted and worked up as in Example 2. A symmetrical carbonic acid ester having a residual OH value of 15 was obtained.

EXAMPLE 4

0.9 Mol diethyl carbonate and 0.5 mol-% sodium methanolate in the form of a 30% methanol solution and 1 mol of a commercially available adduct of 2 mol ethylene oxide with 1 mol of a technical $C_{12-18}$ fatty alcohol mixture (chain distribution 0 to 3% $C_{10}$; 48 to 58% $C_{12}$; 19 to 24% $C_{14}$; 9 to 12% $C_{16}$; 11 to 14% $C_{18}$; 0 to 5% $C_{20}$) were reacted as in Example 2. A symmetrical carbonic acid ester having a residual OH value of 37 was obtained.

EXAMPLE 5

Dimethyl carbonate, sodium methanolate in the form of a 30% methanol solution and a commercially available adduct of 7 mol ethylene oxide with 1 mol of a technical $C_{12-18}$ fatty alcohol mixture (for chain distribution, see Example 4) were reacted and worked up as in Example 2. A symmetrical carbonic acid ester having a residual OH value of 14 was obtained.

EXAMPLE 6

4 Mol diethyl carbonate, 0.5 mol-% sodium methanolate in the form of a 30% methanol solution and 1 mol of a commercially available adduct of 8 mol ethylene oxide with 1 mol technical octanol (chain distribution 0 to 2% C$_6$; 94 to 98% C$_8$; 0 to 5% C$_{10}$) were reacted and worked up as in Example 1. An asymmetrical carbonic acid ester having a residual OH value of 3 was obtained.

EXAMPLE 7

The reaction was carried out and the reaction product worked up in the same way as in Example 6, except that a commercially available adduct of 4 mol ethylene oxide with 1 mol of a technical octanol was used. An asymmetrical carbonic acid ester having a residual OH value of 5.5 was obtained.

EXAMPLE 8

1.5 Mol diethyl carbonate, 0.5 mol-% sodium methanolate in the form of a 30% methanol solution and 2 mol of a commercially available adduct of 4 mol ethylene oxide with technical octanol were reacted and worked up as in Example 2. A symmetrical carbonic acid ester having a residual OH value of 12 was obtained.

B) Performance tests 110 g sugar sirup (beet tops) and 420 ml water were introduced into a 2 liter measuring cylinder. Using a laboratory flow inducer with an output of 3 liters per minute, the solution was withdrawn from the bottom of the measuring cylinder with a glass tube. The liquid was returned by a second tube of which the lower end was level with the top edge of the measuring cylinder. When foam and liquid together reached a volume of 2000 ml, 0.05 ml of the various foam control agents were added by micropipette and the total volume of foam height and liquid was read off after 0.5, 1, 2, 3, 5, 10, 20 and 30 minutes. In this way, the carbonic acid esters of Examples 1 to 8 were tested at various pH values adjusted by addition of potassium hydroxide and at various temperatures. Table I shows the total volume of liquid and foam height as a function of time, pH value, temperature and the particular foam control agent added.

C) Biological degradability

The ester of Example 4 was tested for its biological degradability by the Closed Bottle Test and the BODIS Test (total degradation). The solubility of the ester was improved by addition of the alkylphenol polyalkylene glycol ether nonylphenol-10EO-5PO. Ultrasound was applied for dispersion.

The ester according to the invention achieved BOD/COD results of >60% in the CB Test and values of >80% BOD$_{28}$/COD in the BODIS Test. Accordingly, the ester may be classified as readily biodegradable.

We claim:

1. In a method of suppressing foaming in the processing of sugar beets or potatoes or in fermentation processes in the processes or production of foods, the improvement comprising using a carbonic acid ester corresponding to general formula I:

$$R^1O(-C_2H_4O)_n \diagdown C=O \diagup R^2O(-C_2H_4O)_m \quad (I)$$

wherein:
- R$^1$ is an alkyl radical derived from an aliphatic saturated primary alcohol containing 1 to 22 carbon atoms;
- R$^2$ is an alkyl radical derived from an aliphatic, saturated primary alcohol containing 1 to 8 carbon atoms and/or has the same meaning as R$^1$;
- n is a number from 2 to 20; and
- m is 0 or has the same meaning as n, in a material to be defoamed and in an amount effective to suppress foaming in said material.

2. A method as claimed in claim 1 wherein said carbonic acid ester of general formula I are liquid at temperatures below 25° C.

3. A method as claimed in claim 1 wherein said carbonic acid ester of general formula I are liquid at temperatures below 10° C.

4. A method as claimed in claim 1 wherein R$^2$ and R$^1$ represent the same alkyl radical derived from an aliphatic, saturated primary C$_{6-20}$ alcohol, and n and m represent the same number and are each from 2 to 16.

5. A method as claimed in claim 4 wherein said aliphatic, saturated primary C$_{6-20}$ alcohol is an unbranched C$_{8-8}$ alcohol.

6. A method as claimed in claim 1 wherein R$^1$ is an alkyl radical derived from an aliphatic, saturated primary C$_{6-20}$ alcohol, R$^2$ is a methyl or ethyl radical, n is a number of from 2 to 16, and m is 0.

7. A method as claimed in claim 6 wherein said aliphatic, saturated primary C$_{6-20}$ alcohol is an unbranched C$_{8-18}$ alcohol.

8. A method as claimed in claim 1 wherein said carbonic acid ester of general formula I are used in quantities below 1% by weight based on the material to be defoamed.

9. A method as claimed in claim 1 wherein said carbonic acid ester of general formula I are used in quantities of 0.001 to 0.8% by weight, based on the material to be defoamed.

10. A method as claimed in claim 1 wherein said method is practiced in the storage, processing, or size-reduction of sugar beets and in the production of baker's yeast using molasses.

TABLE I

| Foam control agent acc. to Example | Blank value | Time in minutes after addition of defoamer | | | | | | | pH | Temperature |
|---|---|---|---|---|---|---|---|---|---|---|
| | | 0.5 | 1 | 2 | 3 | 5 | 10 | 20 | 30 | | |
| 1 | 2000 | 980 | 700 | 660 | 660 | 620 | 600 | 580 | 600 | 5.5 | 23° C. |
| 2 | 2000 | 1400 | 820 | 700 | 660 | 660 | 660 | 700 | 740 | 5.5 | 23° C. |
| 3 | 2000 | 640 | 540 | 500 | 460 | 460 | 500 | 560 | 600 | 5.5 | 23° C. |
| 4 | 2000 | 700 | 660 | 640 | 620 | 580 | 580 | 620 | 640 | 5.5 | 23° C. |
| 5 | 2000 | 900 | 540 | 500 | 460 | 460 | 480 | 560 | 600 | 5.5 | 23° C. |
| 6 | 2000 | 520 | 560 | 580 | 620 | 640 | 680 | 740 | 780 | 5.5 | 23° C. |
| 7 | 2000 | 520 | 500 | 520 | 560 | 600 | 640 | 680 | 720 | 5.5 | 23° C. |
| 8 | 2000 | 520 | 520 | 520 | 520 | 520 | 520 | 540 | 580 | 5.5 | 23° C. |
| 8 | 2000 | 520 | 540 | 560 | 560 | 560 | 560 | 580 | 600 | 5.5 | 40° C. |
| 8 | 2000 | 460 | 440 | 440 | 440 | 440 | 460 | 500 | 500 | 11 | 10° C. |

UNITED STATES PATENT AND TRADEMARK OFFICE
CERTIFICATE OF CORRECTION

PATENT NO.  : 5,378,485
DATED       : January 3, 1995
INVENTOR(S) : Mahler et. al.

It is certified that error appears in the above-indentified patent and that said Letters Patent is hereby corrected as shown below:

In claim 5, column 8, line 35, "$C_{8-8}$", should read:
    -- $C_{8-18}$ --.

Signed and Sealed this

Thirteenth Day of June, 1995

*Attest:*

BRUCE LEHMAN

*Attesting Officer*        *Commissioner of Patents and Trademarks*